US010968325B2

(12) United States Patent
Stadermann et al.

(10) Patent No.: US 10,968,325 B2
(45) Date of Patent: *Apr. 6, 2021

(54) PREPARATION OF LARGE ULTRATHIN FREE-STANDING POLYMER FILMS (71) Applicants: LAWRENCE LIVERMORE NATIONAL SECURITY, LLC, Livermore, CA (US); General Atomics, San Diego, CA (US)

(72) Inventors: Michael Stadermann, Pleasanton, CA (US); Salmaan H. Baxamusa, Livermore, CA (US); William C. Floyd, III, Oakland, CA (US); Philip E. Miller, Livermore, CA (US); Tayyab I. Suratwala, Pleasanton, CA (US); Anatolios A. Tambazidis, Pleasanton, CA (US); Kelly Patricia Youngblood, Livermore, CA (US); Chantel Aracne-Ruddle, Livermore, CA (US); Art J. Nelson, Livermore, CA (US); Maverick Chea, Cypress, CA (US); Shuali Li, Fremont, CA (US)

(73) Assignees: Lawrence Livermore National Security, LLC, Livermore, CA (US); General Atomics, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/163,220

(22) Filed: Oct. 17, 2018

(65) Prior Publication Data
US 2019/0048158 A1  Feb. 14, 2019

Related U.S. Application Data (62) Division of application No. 15/130,524, filed on Apr. 15, 2016, now Pat. No. 10,131,754.

(Continued)

(51) Int. Cl.
C08J 5/18 (2006.01)
B32B 43/00 (2006.01)
(Continued)

(52) U.S. Cl.
CPC ........ C08J 5/18 (2013.01); B05D 1/36 (2013.01); B05D 3/107 (2013.01); B05D 3/12 (2013.01);
(Continued)

(58) Field of Classification Search
CPC . B05D 1/36; B05D 3/107; B05D 3/12; B05D 7/24; B05D 7/52; B05D 7/54;
(Continued)

(56) References Cited

U.S. PATENT DOCUMENTS 2,631,334 A * 3/1953 Bailey ................ B29C 39/38
264/298
4,374,891 A * 2/1983 Ward, III ............ B01D 69/122
428/220

(Continued)

FOREIGN PATENT DOCUMENTS

CN  105110323 A   12/2015
EP  1666522 A1 *  6/2006  ............. B32B 3/26
(Continued)

OTHER PUBLICATIONS

Stadermann et al. ("Environmental effects on tent processing and tent stability in NIC targets" 20th Target Fabrication Conference; LLNL-PRES-501751; May 21, 2011) (Year: 2011).*
(Continued)

Primary Examiner — Travis M Figg
(74) Attorney, Agent, or Firm — Eddie E. Scott (57) ABSTRACT A method of making large ultrathin free-standing polymer films without use of a sacrificial layer includes the steps of providing a substrate, applying a polyelectrolyte material to said substrate, applying a polymer material onto said sub-
(Continued)

strate and onto said polyelectrolyte material, and directly delaminating said polymer material from said substrate and said polyelectrolyte to produce the ultrathin free-standing polymer film.

1 Claim, 12 Drawing Sheets

Related U.S. Application Data (60) Provisional application No. 62/150,392, filed on Apr. 21, 2015.

(51) Int. Cl.
| | | |
|---|---|---|
| B05D 3/10 | (2006.01) | |
| B05D 7/00 | (2006.01) | |
| B05D 3/12 | (2006.01) | |
| B32B 27/28 | (2006.01) | |
| B05D 7/24 | (2006.01) | |
| B32B 27/06 | (2006.01) | |
| B05D 1/36 | (2006.01) | |
| B32B 38/00 | (2006.01) | |

(52) U.S. Cl.
CPC .............. *B05D 7/24* (2013.01); *B05D 7/52* (2013.01); *B05D 7/54* (2013.01); *B32B 27/06* (2013.01); *B32B 27/28* (2013.01); *B32B 43/006* (2013.01); *B05D 2201/04* (2013.01); *B05D 2203/30* (2013.01); *B05D 2350/60* (2013.01); *B32B 2038/0056* (2013.01); *C08J 2325/06* (2013.01); *C08J 2329/14* (2013.01); *C08J 2333/12* (2013.01)

(58) Field of Classification Search
CPC ............ B05D 2201/04; B05D 2203/30; B05D 2350/60; B32B 27/06; B32B 27/28; B32B 43/006; B32B 2038/0056; C08J 5/18; C08J 2325/06; C08J 2329/14; C08J 2333/12

See application file for complete search history.

(56) References Cited

U.S. PATENT DOCUMENTS

| | | | | |
|---|---|---|---|---|
| 4,746,472 A | * | 5/1988 | Kohn | B01D 69/122 210/500.27 |
| 4,746,473 A | * | 5/1988 | Kohn | B01D 69/122 106/169.01 |
| 4,746,474 A | * | 5/1988 | Kohn | B01D 69/122 210/500.39 |
| 4,746,475 A | * | 5/1988 | Kohn | B01D 69/122 106/170.54 |
| 4,746,476 A | * | 5/1988 | Kohn | B01D 69/122 210/500.36 |
| 4,765,939 A | * | 8/1988 | Kohn | B29C 41/12 264/298 |
| 4,776,999 A | * | 10/1988 | Kohn | B29C 41/24 210/500.41 |
| 4,880,699 A | * | 11/1989 | Kohn | B01D 69/122 428/333 |
| 4,900,621 A | * | 2/1990 | Kohn | B01D 69/122 264/298 |
| 4,900,623 A | * | 2/1990 | Kohn | B29C 41/12 264/298 |
| 4,908,266 A | * | 3/1990 | Kohn | B01D 69/122 264/298 |
| 4,908,267 A | * | 3/1990 | Kohn | B29C 41/24 264/298 |
| 4,910,082 A | * | 3/1990 | Kohn | B01D 69/122 264/298 |
| 4,910,083 A | * | 3/1990 | Kohn | B01D 69/122 428/220 |
| 4,929,405 A | * | 5/1990 | Kohn | B01D 69/122 210/500.39 |
| 5,261,977 A | * | 11/1993 | Powell | B01D 69/122 156/150 |
| 7,781,050 B2 | * | 8/2010 | Kim | B82Y 30/00 428/220 |
| 8,263,192 B2 | * | 9/2012 | Koberstein | A61L 27/34 427/2.13 |

FOREIGN PATENT DOCUMENTS

| | | | | |
|---|---|---|---|---|
| FR | 2690451 A1 | * | 10/1993 | ............... C08J 5/18 |
| JP | 2012236125 A | | 12/2012 | |
| KR | 20070099756 A | * | 10/2007 | ............... C08J 5/18 |

OTHER PUBLICATIONS

Bertrand et al., "Ultrathin Polymer Coatings by Complexation of Polyelectrolytes at Interfaces: Suitable Materials, Structure and Properties," Macromol. Rapid Commun. vol. 21, 2000, pp. 319-348.
Mallwitz et al., "Direct Access to Stable, Freestanding Polymer Membranes by Layer-by-Layer Assembly of Polyelectrolytes," Adv. Mater, vol. 17, 2005, pp. 1296-1299.
O'Connell et al., "Creep Behavior of Ultra-Thin Polymer Films," Journal of Polymer Science: Part B: Polymer Physics, vol. 46, 2008, pp. 1952-1965.
Ono et al., "Preparation of Ultrathin Self-Standing Polyelectrolyte Multilayer Membranes at Physiological Conditions Using pH-Responsive Film Segments as Sacrificial Layers," Nano Lett., vol. 6, No. 4, 2006, pp. 592-598.
Entry for "PolyDadMac," retrieved from https://en.wikipedia.org/wiki/PolyDADMAC on Apr. 15, 2018, 2018, 3 pps.

* cited by examiner

PREPARATION OF LARGE ULTRATHIN FREE-STANDING POLYMER FILMS

CROSS-REFERENCE TO RELATED APPLICATIONS

The present application is a Division of application Ser. No. 15/130,524 filed Apr. 15, 2016, which claims benefit under 35 U.S.C. § 119(e) of U.S. Provisional Patent Application No. 62/150,392 filed Apr. 21, 2015 entitled "preparation of large ultrathin free-standing polymer film," the content of which is hereby incorporated by reference in its entirety for all purposes.

STATEMENT AS TO RIGHTS TO APPLICATIONS MADE UNDER FEDERALLY SPONSORED RESEARCH AND DEVELOPMENT

The United States Government has rights in this application pursuant to Contract No. DE-AC52-07NA27344 between the United States Department of Energy and Lawrence Livermore National Security, LLC for the operation of Lawrence Livermore National Laboratory.

BACKGROUND

Field of Endeavor

The present application relates to polymer films and more particularly to free-standing ultra-thin polymer films.

State of Technology

This section provides background information related to the present disclosure which is not necessarily prior art.

Figure 1A:
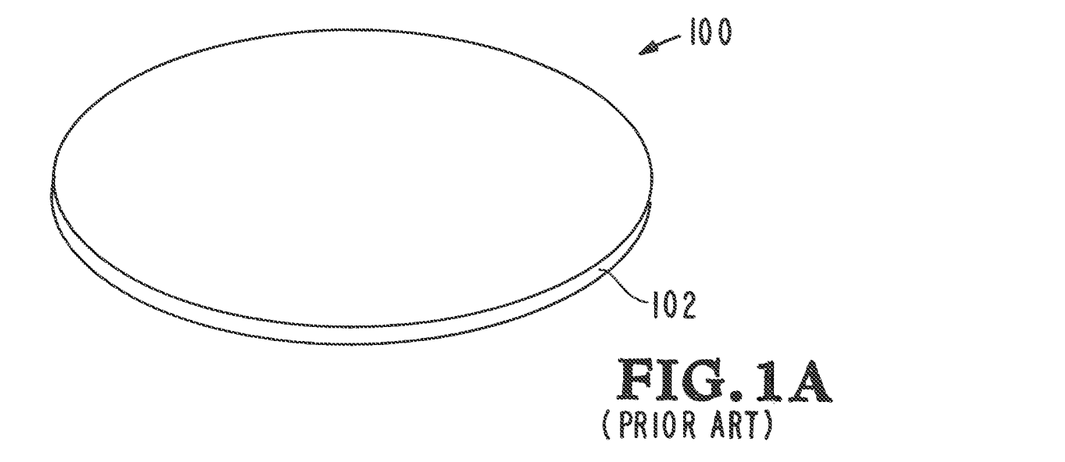
FIGS. 1A, 1B, 1C, and 1D illustrate the Prior Art method of preparing ultra-thin polymer films.
Figure 1B:
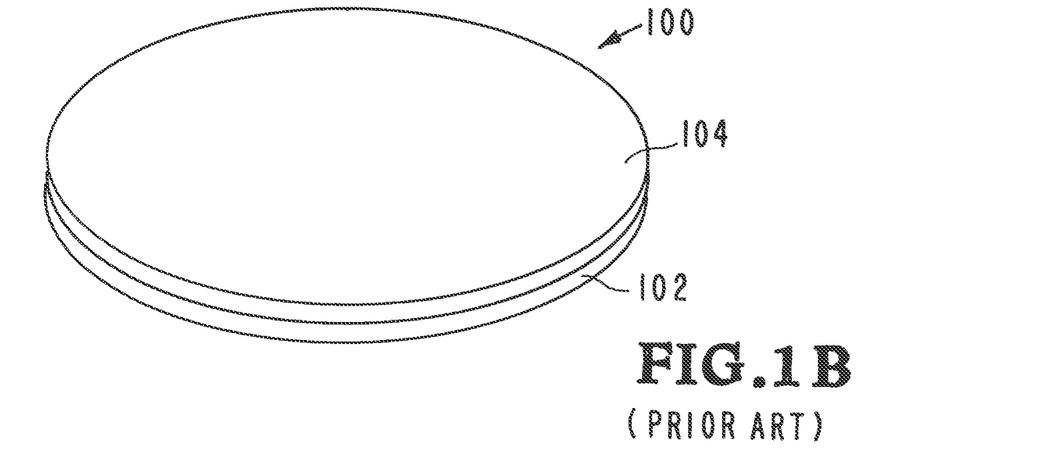
Figure 1C:
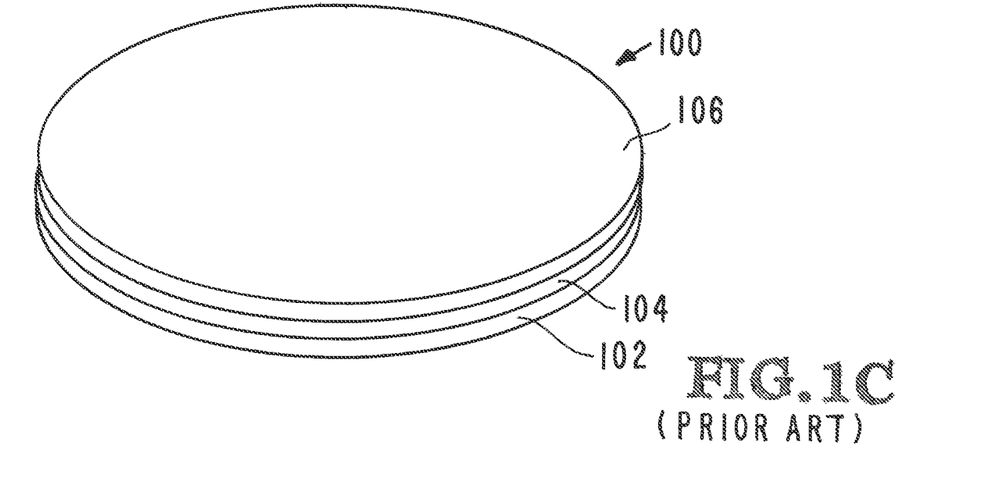
Figure 1D:
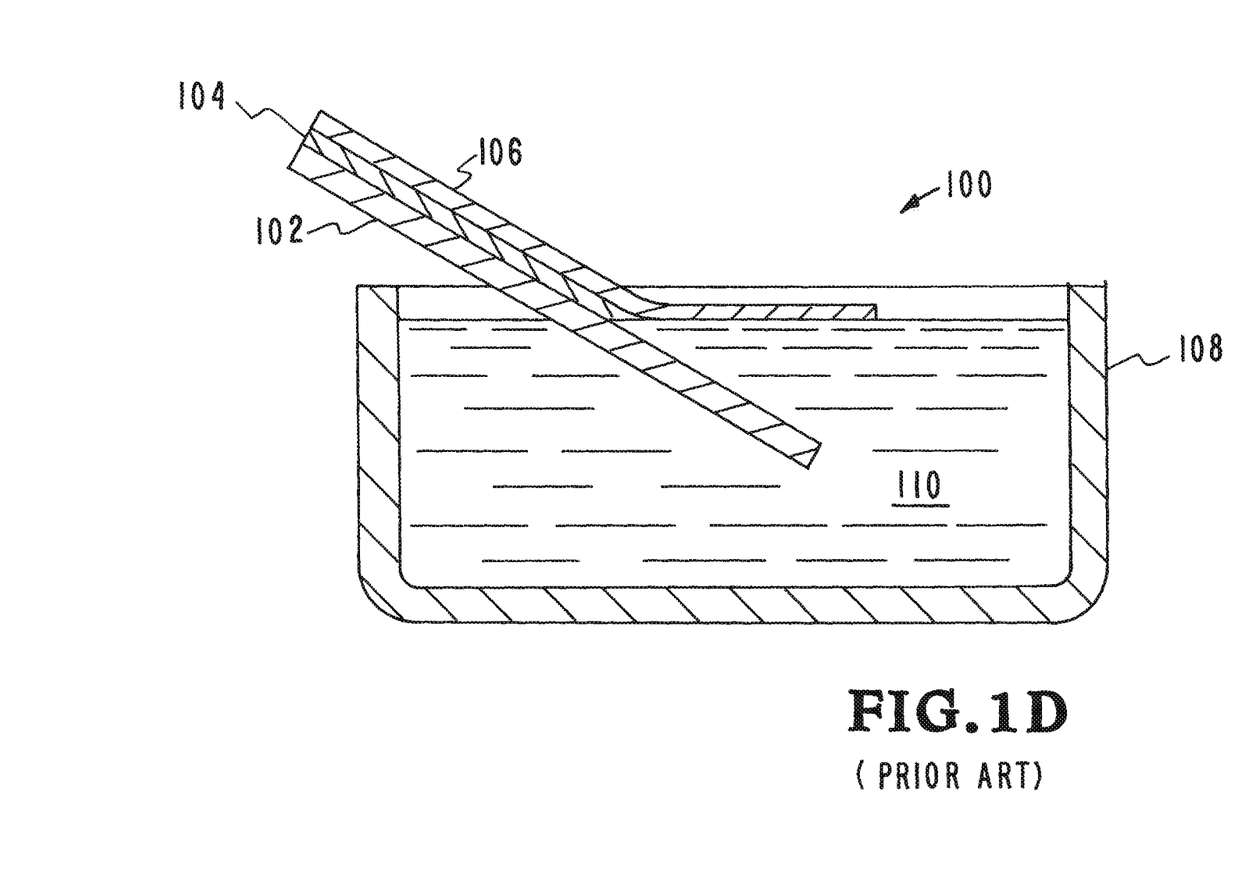

The Prior Art method of preparing ultra-thin polymer films is illustrated in FIGS. 1A, 1B, 1C, and 1D of the drawings. The Prior Art method is designated generally by the reference numeral 100. The Prior Art method 100 includes the addition of a release layer. The release layer is a sacrificial layer that is dissolved when the film is removed from the substrate. The films are removed from the substrate by immersing the substrate into water, which separates the film from the substrate, and the film will float on the water surface. FIG. 1A shows a silicon wafer 102. The silicon wafer 102 is the starting point in the Prior Art method 100 of preparing ultra-thin polymer films. Referring now to FIG. 1B a sacrificial layer 104 is shown on top of the silicon wafer 102. The sacrificial layer 104 can be made of sputtered salt, soap or other release agents, such as Victawet. Referring now to FIG. 1C a formar film 106 is show on top of the sacrificial layer 104 the silicon wafer 102. Referring now to FIG. 1D the step of removing the formar film 106 from the substrate 102 is illustrated. This is accomplished by immersing the substrate 102 into water 110 in a water bath 108. This dissolves the water soluble sacrificial layer 104 and separates the film 106 from the substrate 102.

The Prior Art method of preparing ultra-thin polymer films has several disadvantages. The substrate preparation can introduce roughness, especially in the case of sputtered liftoff layers, which can be on the order of several nanometers, which leads to film non-uniformity and becomes more severe as the film thickness is reduced below 20 nm. Sacrificial liftoff layers can contaminate the film and decrease the strength of the film. At thicknesses lower than 30 nm, the liftoff of the film from the substrate becomes impossible for some preparations. Another drawback is the inability to produce large free-standing films. This inability is related to the shape of the holder, the liftoff technique itself, and the properties of the polymer that is used to produce the thin film. Large films will often tear when lifted out of the water, and in some cases they tear while drying.

SUMMARY

Features and advantages of the disclosed apparatus, systems, and methods will become apparent from the following description. Applicant is providing this description, which includes drawings and examples of specific embodiments, to give a broad representation of the apparatus, systems, and methods. Various changes and modifications within the spirit and scope of the application will become apparent to those skilled in the art from this description and by practice of the apparatus, systems, and methods. The scope of the apparatus, systems, and methods is not intended to be limited to the particular forms disclosed and the application covers all modifications, equivalents, and alternatives falling within the spirit and scope of the apparatus, systems, and methods as defined by the claims.

The inventors have developed apparatus, systems, and methods that overcome the limitations of earlier methods. In various embodiments the inventors have developed apparatus, systems, and methods for directly delaminating extraordinarily thin films of polymer material from a substrate without the use of a sacrificial layer. The inventors have also developed a holder for film manipulation, using a marker to locate the film in the water, and unique procedures that include moving the wafer into and/or out of the water at a desired angel and speed. In one embodiment, the inventors have developed apparatus, systems, and methods for preparing large ultrathin free-standing polymer films by providing a polymer material, providing a substrate, processing the substrate with a polyelectrolyte, applying the polymer material to the substrate, and directly delaminating extraordinarily thin films of the polymer material from the substrate without the use of a sacrificial layer.

The inventors have shown the direct delamination of extraordinarily thin (as thin as 8 nm) films of poly(vinyl formal) (PVF), polystyrene, and poly(methyl methacrylate). Large (up to 13 cm diameter) films of PVF could be captured on wire supports to produce free-standing films. By modifying the substrate to lower the interfacial energy resisting film-substrate separation, the conditions for spontaneous delamination are satisfied even for very thin films. The substrate modification is based on the electrostatic adsorption of a cationic polyelectrolyte. Eliminating the use of sacrificial materials and instead relying on naturally self-limiting adsorption makes this method suitable for large areas. Features of the inventor's apparatus, systems, and methods are described below.

Feature 1. The substrate is a silicon wafer cleaned with an oxidizing acid. This substrate is both very flat and wets well, two preconditions for making thin films and removing them from the substrate.

Feature 2. A polyelectrolyte (poly(diallylammonium chloride) (PDAC)) is used as liftoff agent. The agent is not deployed as a sacrificial layer that is dissolved off during the process, but instead is deployed as a monolayer. The expected effect of the monolayer is to maintain a high wettability of the substrate while reducing interaction (such as hydrogen bonding) between substrate and polymer film. The inventors assume that the superior performance of the liftoff agent is a result of introducing a surplus of positive charge that more efficiently screens the negative charge on the substrate.

Feature 3. Very thin films are marked with permanent markers, so that they can be found after liftoff. At thicknesses of 10 nm or less, the films are practically invisible on the water, and the marker outline guides the fabricator to successful liftoff. Using the correct marker is important: some markers reduce the strength of the film, other detach from the film in the water and can contaminate the film.

Feature 4. Custom holders are used to pick up the films from the water surface. The thickness of these holders should not exceed 1.5 mm to avoid creating a large meniscus on the back side of the holder while the film is picked up. Films thinner than 20 nm can be torn apart by a large meniscus.

Feature 5. The angle of the holder to the water during the pickup is important. Early in the pickup, a shallow angle is preferable, to make sure the film attaches properly to the holder. Once the film is attached, the angle should be changed to become steeper, so that the water meniscus can be minimized. The holder should be pulled out of the water at low speed until the meniscus detaches from the back of the holder; afterwards, it can be removed faster.

The disclosed apparatus, systems, and methods have use for production of ultrathin films for the assembly of inertial confinement fusion targets. These targets have a fuel capsule that must be supported with minimal mass to avoid perturbations to the implosion. The disclosed apparatus, systems, and method also have use in the fabrication of separation membranes for carbon capture and for desalination. Sample substrates for transmission electron microscopy and other microscopy or x-ray methods also use very thin films to maximize contrast with the sample.

The apparatus, systems, and methods are susceptible to modifications and alternative forms. Specific embodiments are shown by way of example. It is to be understood that the apparatus, systems, and methods are not limited to the particular forms disclosed. The apparatus, systems, and methods cover all modifications, equivalents, and alternatives falling within the spirit and scope of the application as defined by the claims.

BRIEF DESCRIPTION OF THE DRAWINGS

The accompanying drawings, which are incorporated into and constitute a part of the specification, illustrate specific embodiments of the apparatus, systems, and methods and, together with the general description given above, and the detailed description of the specific embodiments, serve to explain the principles of the apparatus, systems, and methods.

DETAILED DESCRIPTION OF SPECIFIC EMBODIMENTS

Referring to the drawings, to the following detailed description, and to incorporated materials, detailed information about the apparatus, systems, and methods is provided including the description of specific embodiments. The detailed description serves to explain the principles of the apparatus, systems, and methods. The apparatus, systems, and methods are susceptible to modifications and alternative forms. The application is not limited to the particular forms disclosed. The application covers all modifications, equivalents, and alternatives falling within the spirit and scope of the apparatus, systems, and methods as defined by the claims.

Definitions

As used in this application the terms identified below have the following meanings:

Ultra-thin polymer film=A film with a thicknesses below 100 nm.

Thinnest freestanding film=A film with a thicknesses below 20 nm.

Inventor's Thinnest freestanding film=A film with a thickness below 10 nm.

Shallow Angle=An angle of 35° or less.

The disclosed apparatus, systems, and methods produce extraordinarily thin films of polymer material from a substrate without the use of a sacrificial layer. The disclosed apparatus, systems, and methods also include a holder for film manipulation, a marker for locating the film in water, and unique procedures that include moving the wafer into the water at a desired angle and speed.

One embodiment of the inventor's apparatus, systems, and methods of preparing ultra-thin polymer films is illustrated in FIGS. 2A through 2G of the drawings. The inventor's apparatus, systems, and methods are designated generally by the reference numeral 200. The inventor's apparatus, systems, and methods 200 omit the release layer of the Prior Art. The inventor's apparatus, systems, and methods make modifications to the substrate material itself to enable the preparation of large ultra-thin free-standing films without the use of a sacrificial layer.

Figure 2A:
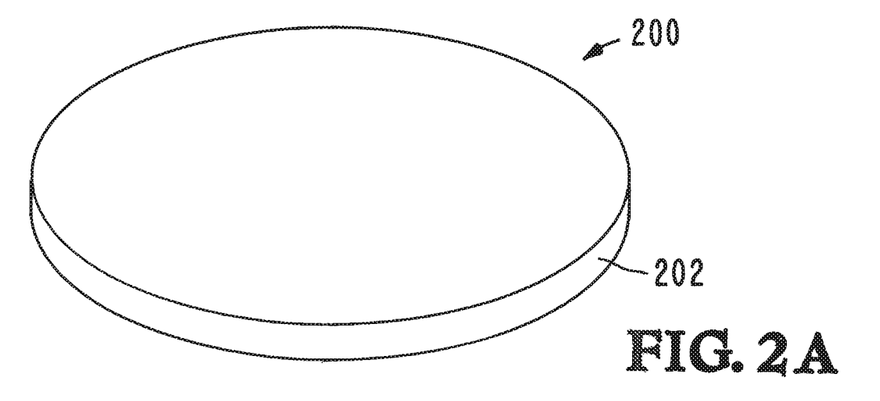
FIGS. 2A through 2G illustrate one embodiment of the inventor's apparatus, systems, and methods of preparing ultra-thin polymer films.
Figure 2B:
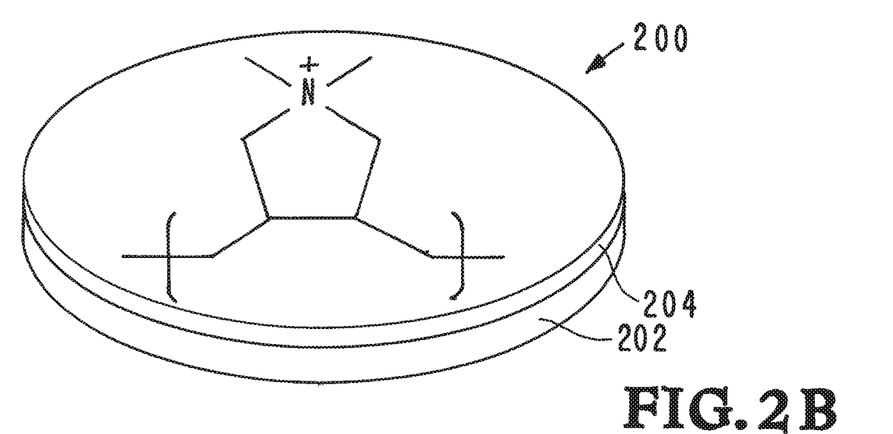

Referring now to FIG. 2A, a silicon wafer 202 is shown. The silicon wafer 202 is the starting point in the inventor's apparatus, systems, and methods of preparing ultra-thin polymer films 200. As shown in FIG. 2B, the surface 204 of the silicon wafer 202 is modified. A polyelectrolyte is applied to the surface 204 of the silicon wafer 202 and the surface 204 is modified by the electrostatically mediated adsorption of the polyectrolyte. In one embodiment a polycation is applied to the surface 204 of the silicon wafer 202 and the surface 204 is modified by the electrostatically mediated adsorption of the polycation. In another embodiment polydiallyldimethylammonium chloride (PDAC) is applied to the surface 204 of the silicon wafer 202 and the surface 204 is modified by the electrostatically mediated adsorption of the polydiallyldimethylammonium chloride.

By modifying the surface of the silicon wafer 202 to lower the interfacial energy resisting film/substrate separation, the conditions for spontaneous delamination are satisfied even for very thin films. Eliminating the use of sacrificial materials and instead relying on naturally self-limiting adsorption makes this method suitable for large areas. The inventors have observed delamination of films with aspect ratios (ratio of lateral dimension between supports to thickness) of $10^7$ and have captured dry, free-standing films with aspect ratios $>10^6$. Films with an aspect ratio of $10^5$ can bear loads up to 106 times the mass of the film itself.

Figure 2C:
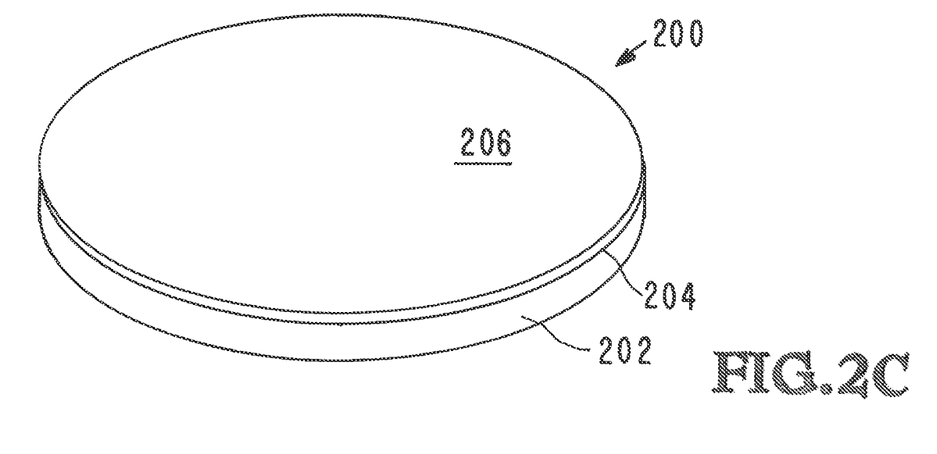

Referring to FIG. 2C a polymer film 206 is applied on the surface 204 that has been electrostatically modified by the adsorption of the polyelectrolyte material that has been applied to the surface 204 of the silicon wafer 202. In one embodiment the polymer film 206 is a formar film.

Figure 2D:
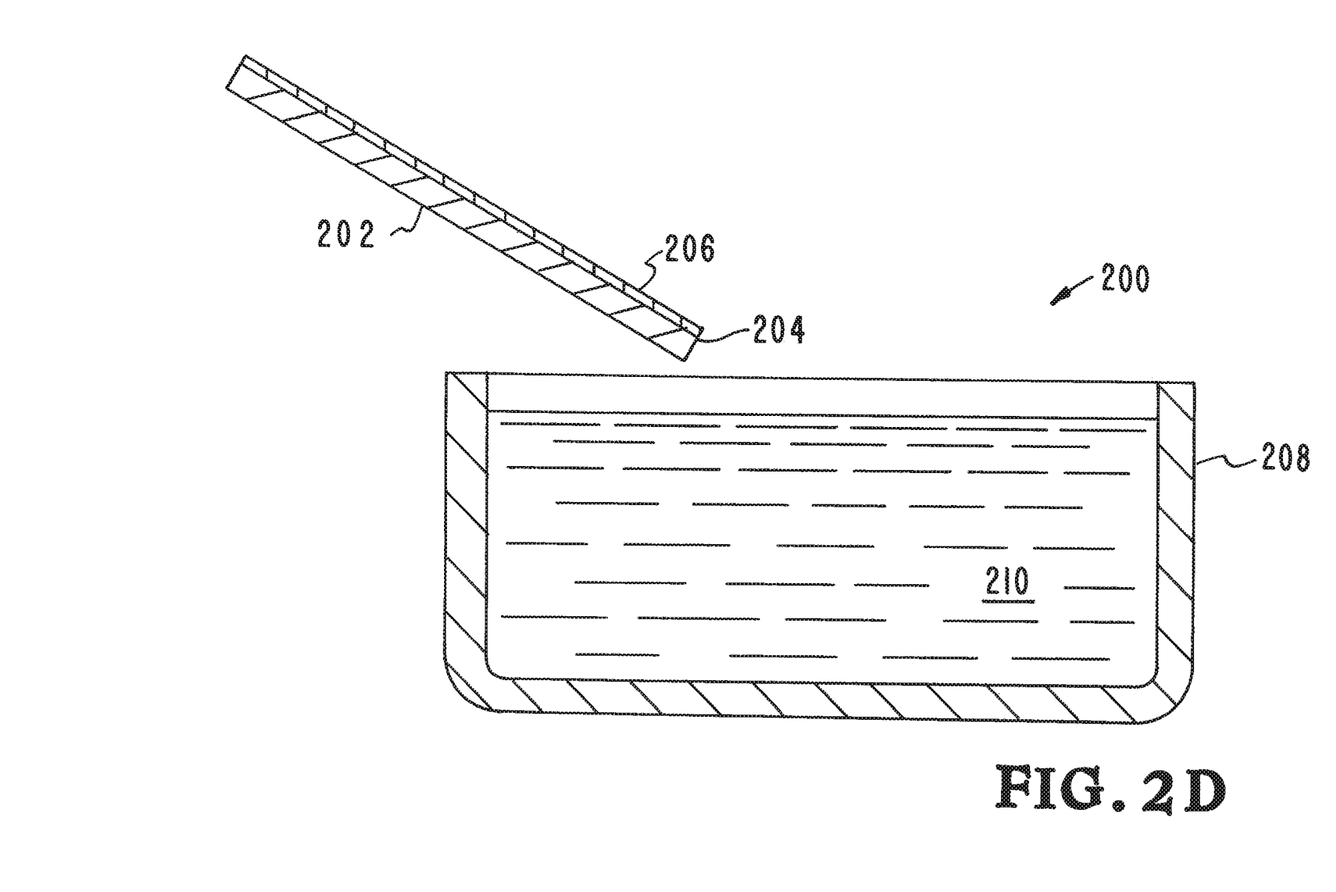

Referring now to FIG. 2D the first step of removing the polymer film 206 from the substrate 202 is illustrated. This is accomplished by immersing the substrate 202 into water 210 in a water bath 208. This begins the process of separating the film 206 from the substrate 202.

Figure 2E:
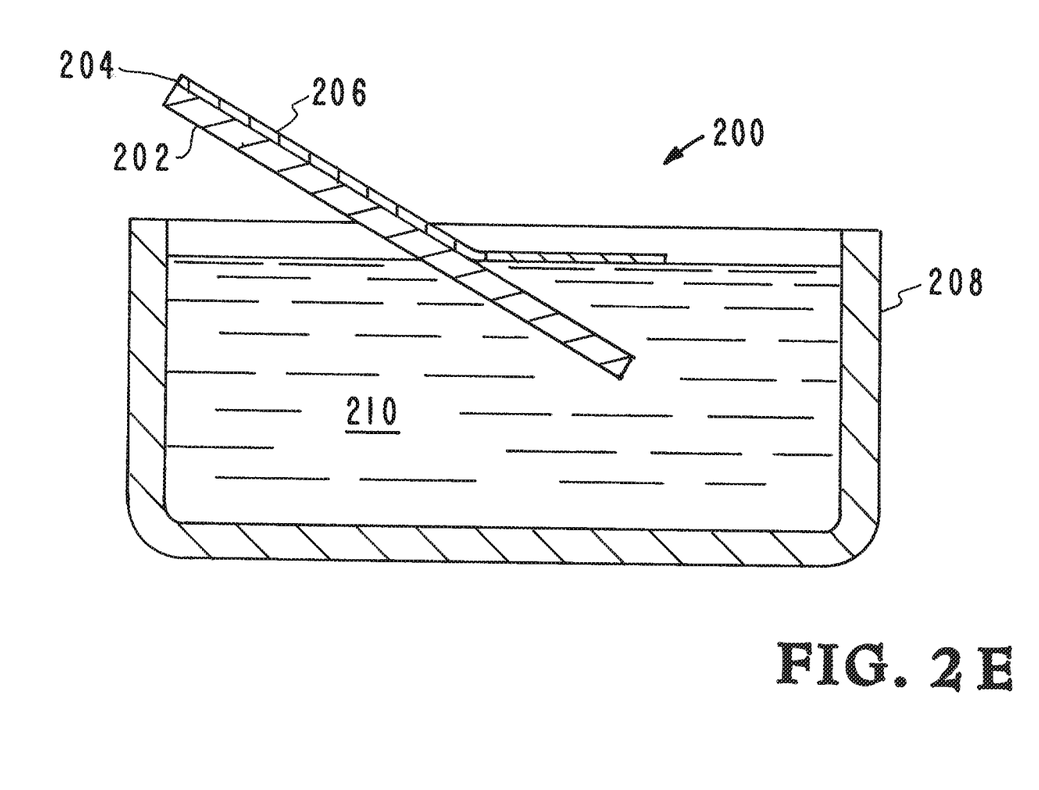
Figure 2F:
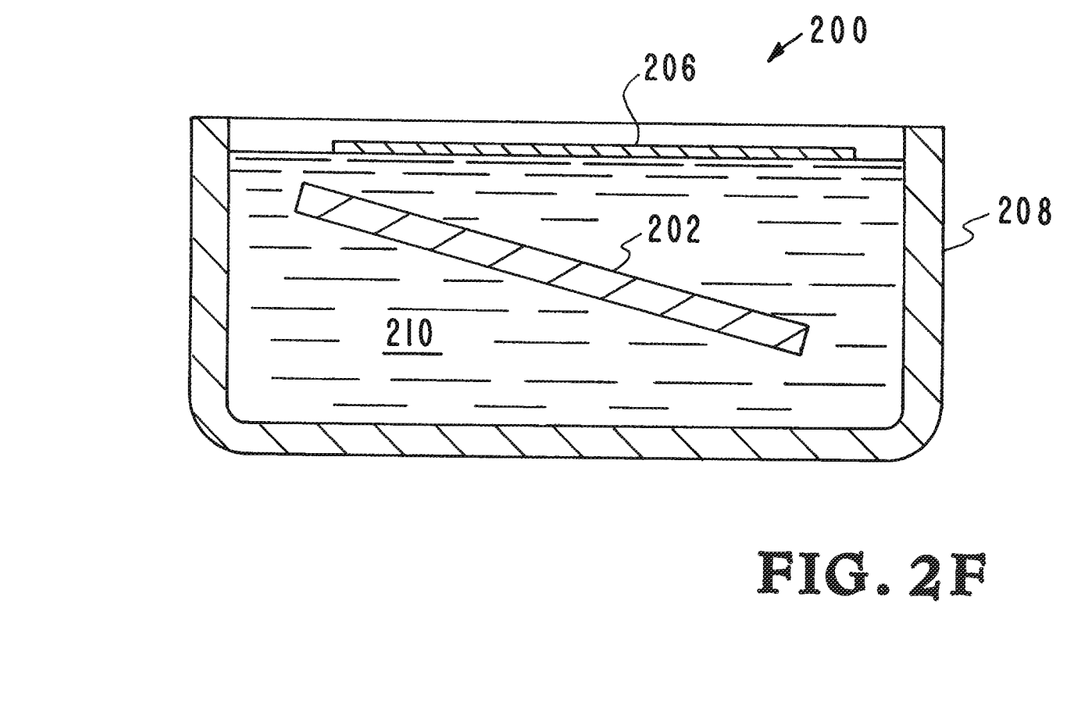
Figure 2G:
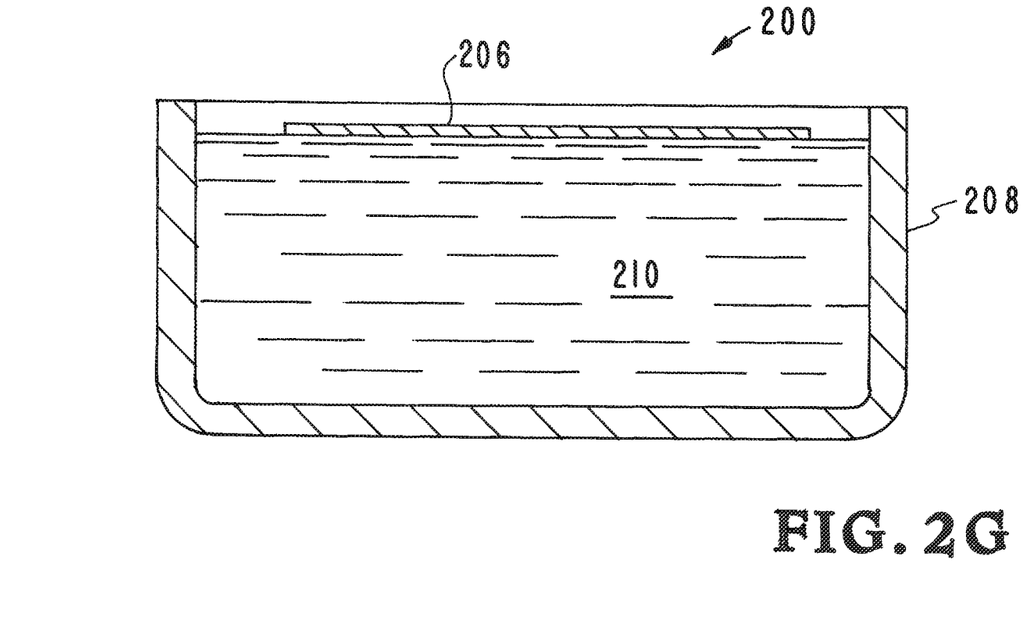

FIGS. 2E, 2F, and 2G illustrate the process of separating the film 206 from the substrate 202. The film 206 is removed from the substrate 202 by immersing the substrate into water 210, which separates the film 206 from the substrate 202. As shown in FIG. 2E, the film 206 has begun to separate from the substrate 202. The surface 204 has been electrostatically modified by adsorption of the polyelectrolyte material that was been applied to the surface 204. As shown in FIG. 2F, the film 206 has almost entirely separated from the substrate 202. FIG. 2G shows that the film 206 has completely separated from the substrate 202 and the film is floating on the water 210 surface.

The process of separating the film 206 from the substrate 202 was accomplished without the use of the Prior Art sacrificial layer. By eliminating the sacrificial layer altogether and instead directly enhancing the release of the film through a predisposition substrate surface modification the inventors have developed a new and improved apparatus, systems, and methods of producing ultra-thin films. The inventor's substrate surface modification provides a lift-off agent that is part of the surface 204 of the silicon wafer 102. The lift-off agent is a polyelectrolyte. In one embodiment, the inventor's modification is based on the electrostatically mediated adsorption of the polyelectrolyte polydiallyldimethylammonium chloride (PDAC). The surface modification has two key characteristics that make it ideally suited for large-area ultrathin films: (1) the chemistry of the modification is chosen based on delamination theory in order to minimize the critical thickness required for spontaneous film release, and (2) the self-limiting nature of the surface modification makes it scalable to large areas without requiring additional process optimization and control. Moreover, the surface modification is entirely water-based, compatible with further aqueous processing, quasi-permanent, and takes only a few minutes.

Figure 3A:
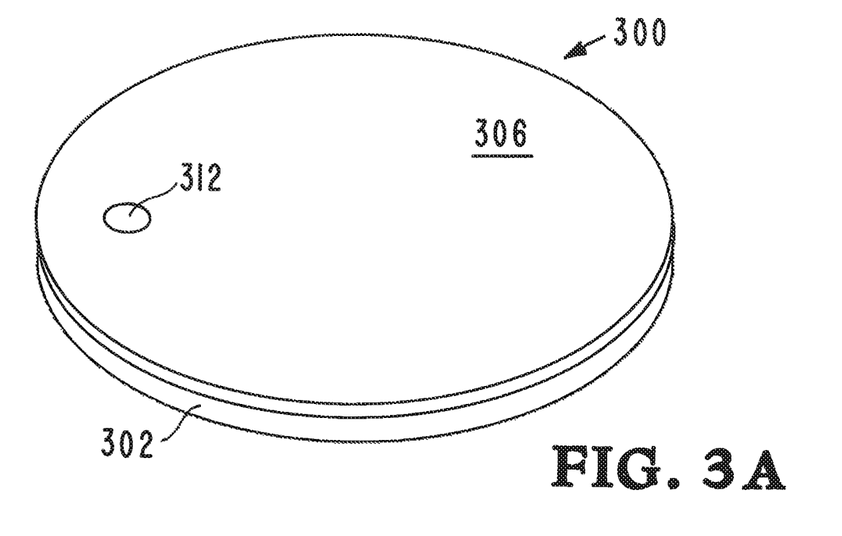
FIGS. 3A, 3B, and 3C illustrate an embodiment of the inventor's apparatus, systems, and methods using a marker to locate the ultra-thin film in the water.
Figure 3B:
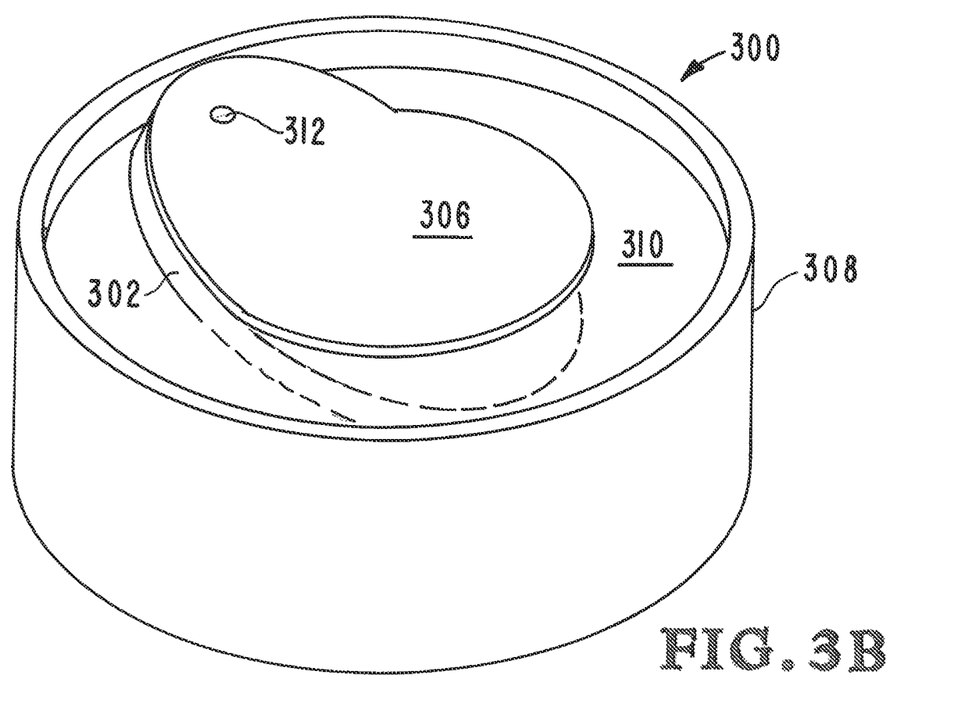
Figure 3C:
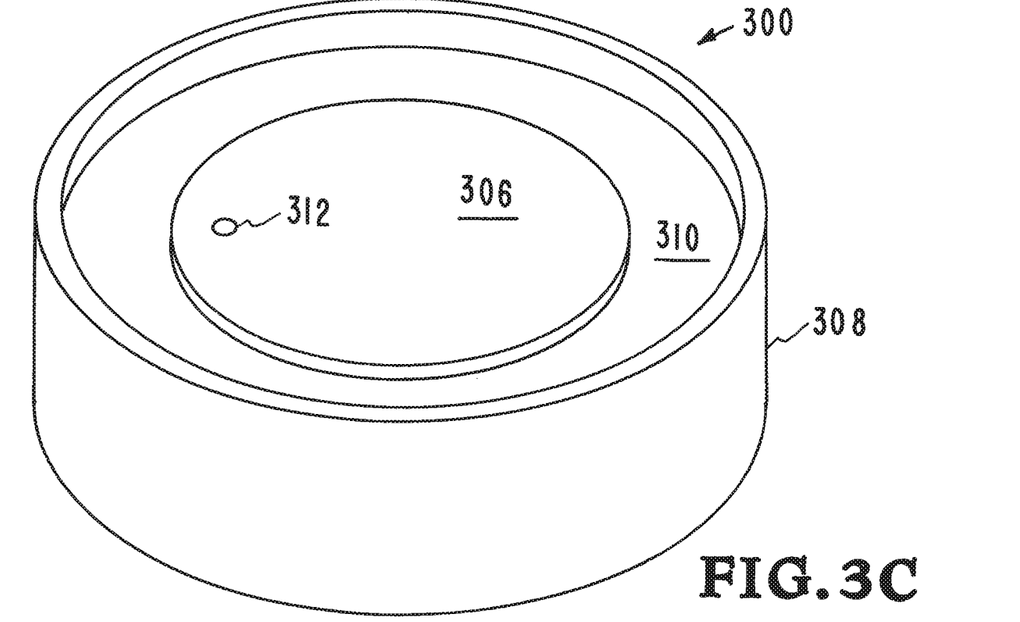

An embodiment of the inventor's apparatus, systems, and methods of using a marker to locate the ultra-thin film in the water is illustrated in FIGS. 3A, 3B, and 3C of the drawings. The illustration is designated generally by the reference numeral 300.

Referring now to FIG. 3A, a silicon wafer 302 is shown with a polymer film 306 applied on the surface 304. A marker 312 has been added to the polymer film 306. The marker 312 will be used to locate the film in the water. FIG. 3B shows the polymer film 306 and substrate 302 being immersing into water 310 in a water bath 308. As shown in FIG. 3C, the film 306 has entirely separated from the substrate 302 and the film is floating on the water 310 surface. The marker 312 is used to locate the film 306 in the water 310.

Figure 4A:
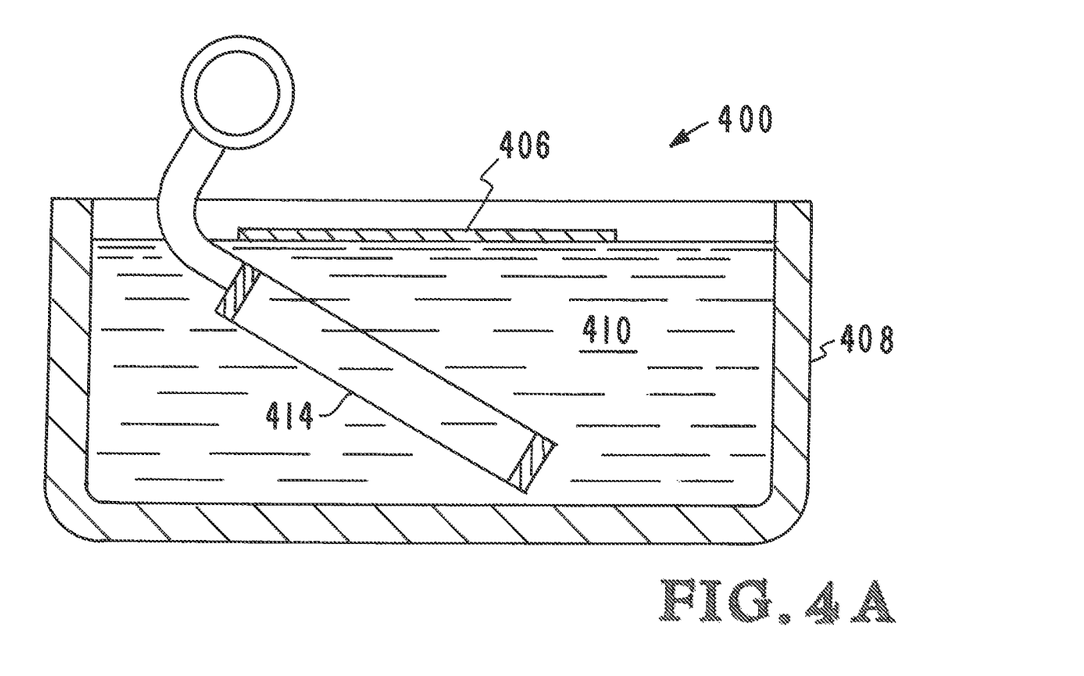
FIGS. 4A, 4B, and 4C illustrate an embodiment of the inventor's apparatus, systems, and methods using a holder to remove the ultra-thin film from water.
Figure 4B:
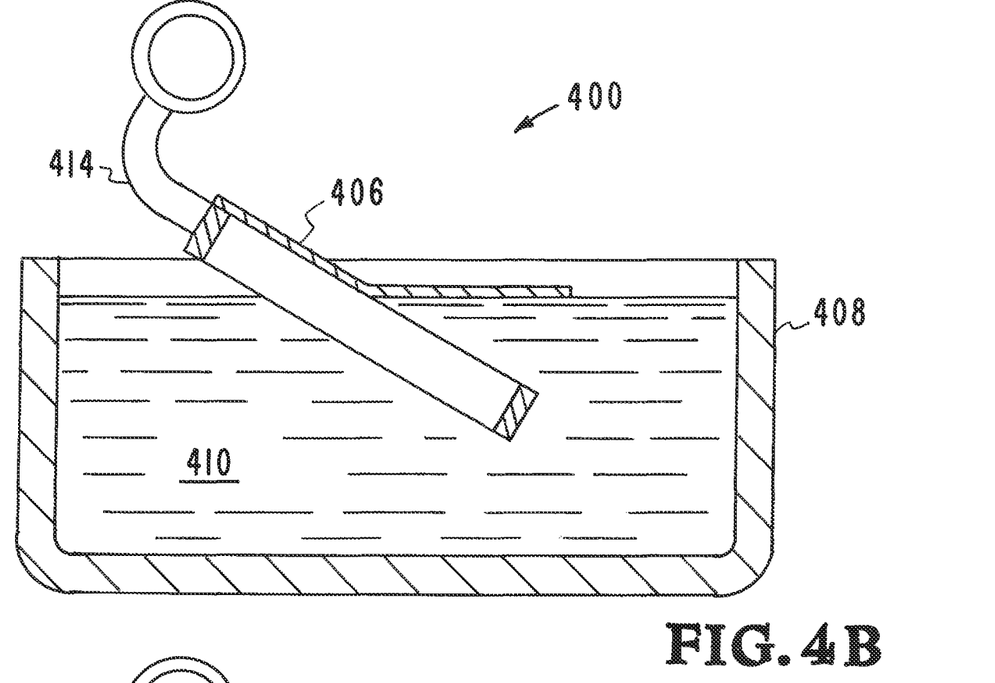
Figure 4C:
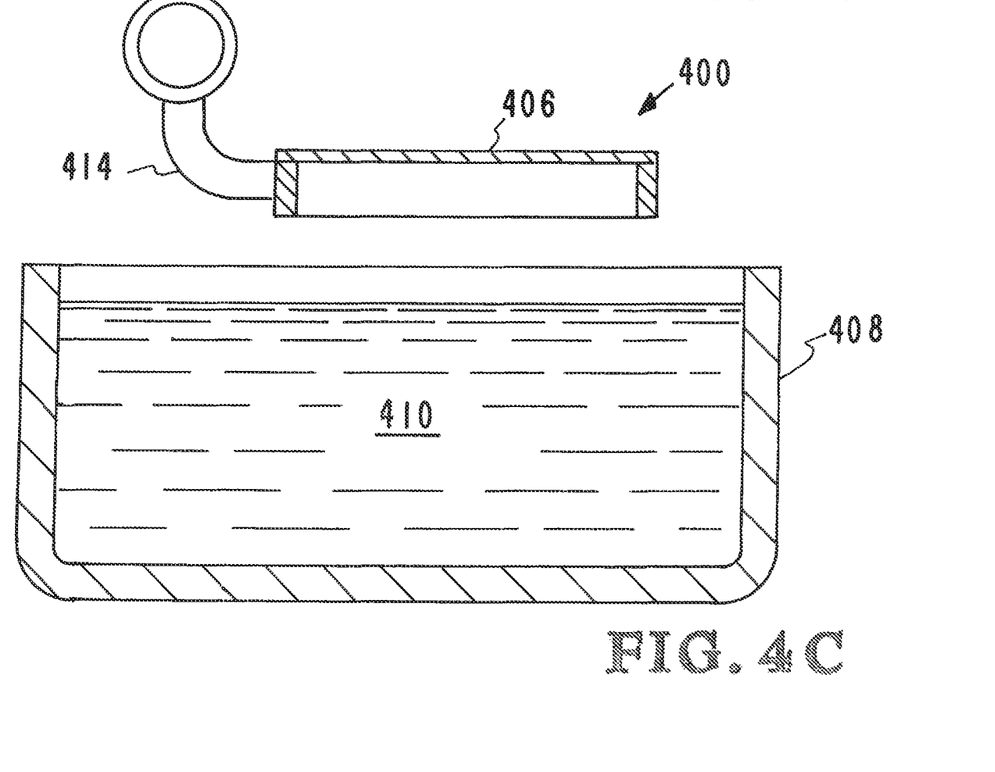

An embodiment of the inventor's apparatus, systems, and methods of using a holder to remove the ultra-thin film from the water is illustrated in FIGS. 4A, 4B, and 4C of the drawings. The illustration is designated generally by the reference numeral 400.

Referring now to FIG. 4A, a polymer film 406 is shown in water 410 in a water bath 408. The polymer film 406 is floating on the water surface. A holder 414 is positioned in the water 410 in the water bath 408 in a position to collect the polymer film 406.

FIG. 4B shows the polymer film 406 and holder 414 being removed from the water 410 in the water bath 408. FIG. 4C shows the film 406 and holder 414 substantially removed from the water 410. The removal of the film 406 and holder 414 is accomplished at a shallow angle.

Figure 5A:
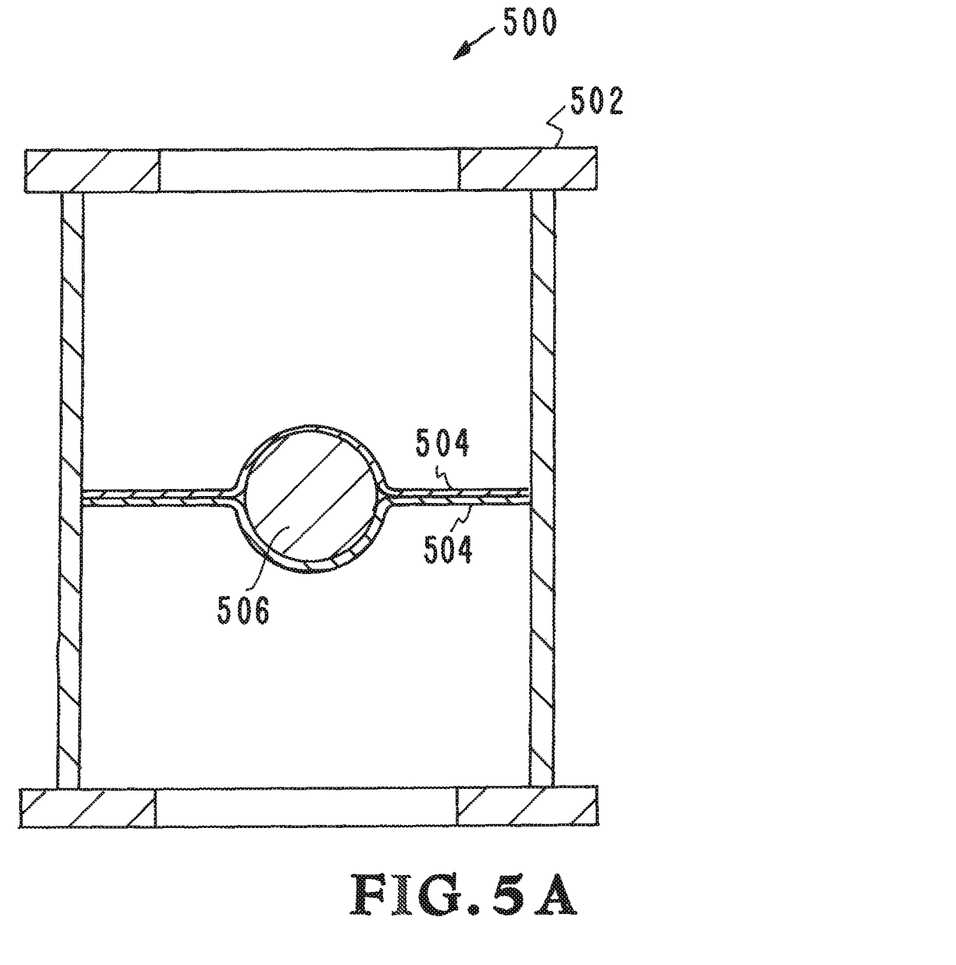
FIGS. 5A and 5B illustrate an embodiment of the inventor's apparatus, systems, and methods using the ultra-thin film to support the target capsule inside the hohlraum of the target chamber of an inertial confinement fusion reactor.
Figure 5B:
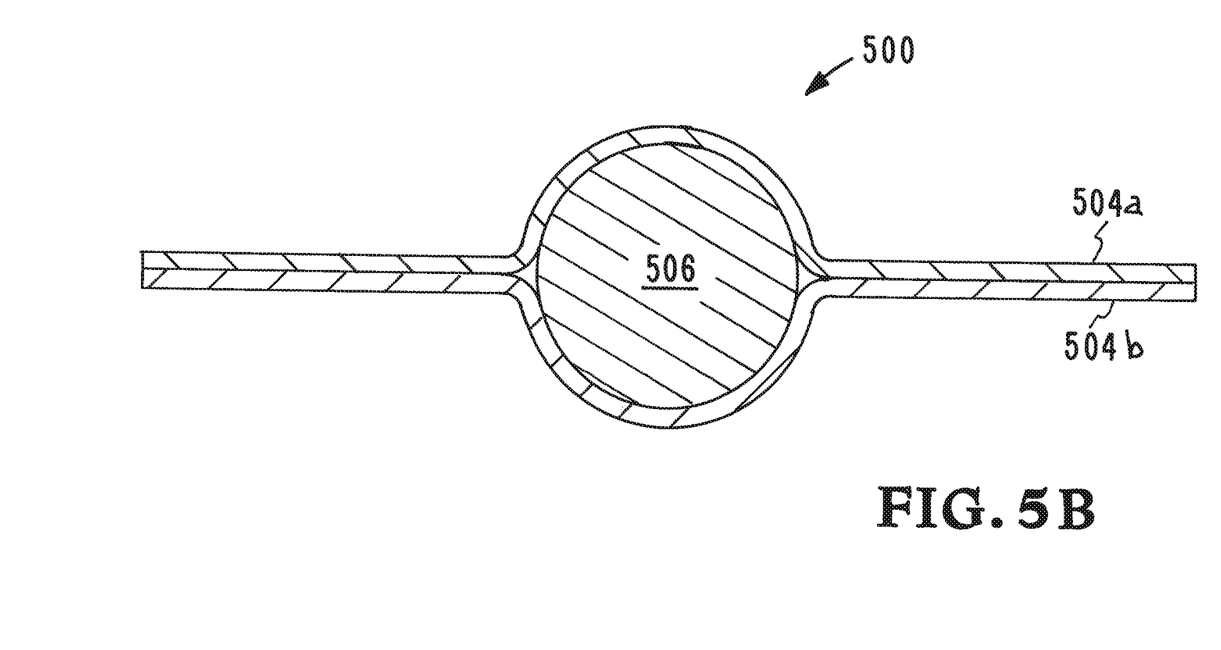

An embodiment of the inventor's apparatus, systems, and methods of using the ultra-thin film for tents for inertial confinement fusion is illustrated in FIGS. 5A and 5B of the drawings. The illustration is designated generally by the reference numeral 500.

Referring now to FIG. 5A, ultra-thin polymer film tents 504 are shown in an inertial confinement fusion target chamber 502. The ultra-thin polymer film tents 504 support the target capsule 506 inside the hohlraum of the target chamber 502.

FIG. 5B is an illustration that shows the target capsule 506 held at the center of the hohlraum by two polymer ultra-thin membranes called tents 504. The two ultra-thin polymer tents 504 are labeled 504*a* and 504*b*.

The journal article "Enhanced Delamination of Ultrathin Free-Standing Polymer Films via Self-Limiting Surface Modification," by Salmaan H. Baxamusa, Michael Stadermann, Chantel Aracne-Ruddle, Art J. Nelson, Maverick Chea, Shuali Li, Kelly Youngblood, and Tayyab I. Suratwala published Apr. 22, 2014, Langmuir 2014, 30, 5126-5132 provides additional details of the Inventor's apparatus, systems, and methods. The journal article "Enhanced Delamination of Ultrathin Free-Standing Polymer Films via Self-Limiting Surface Modification," by Salmaan H. Baxamusa, Michael Stadermann, Chantel Aracne-Ruddle, Art J. Nelson, Maverick Chea, Shuali Li, Kelly Youngblood, and Tayyab I. Suratwala published Apr. 22, 2014, Langmuir 2014, 30, 5126-5132 is incorporated herein in its entirety for all purposes by this reference. Some of the features, procedures, and experimental testing of the inventor's apparatus, systems, and methods are described below.

Feature 1. The substrate is a silicon wafer cleaned with an oxidizing acid. This substrate is both very flat and wets well, two preconditions for making thin films and removing them from the substrate.

Feature 2. A polyelectrolyte (poly(diallylammonium chloride) (PDAC)) is used as liftoff agent. The agent is not deployed as a sacrificial layer that is dissolved off during the process, but instead is deployed as a monolayer. The expected effect of the monolayer is to maintain a high wettability of the substrate while reducing interaction (such as hydrogen bonding) between substrate and polymer film. The inventors assume that the superior performance of the liftoff agent is a result of introducing a surplus of positive charge that more efficiently screens the negative charge on the substrate.

Feature 3. Very thin films are marked with permanent markers, so that they can be found after liftoff. At thicknesses of 10 nm or less, the films are practically invisible on the water, and the marker outline guides the fabricator to successful liftoff. Using the correct marker is important:

some markers reduce the strength of the film, other detach from the film in the water and can contaminate the film.

Feature 4. Custom holders are used to pick up the films from the water surface. The thickness of these holders should not exceed 1.5 mm to avoid creating a large meniscus on the back side of the holder while the film is picked up. Films thinner than 20 nm can be torn apart by a large meniscus.

Feature 5. The angle of the holder to the water during the pickup is important. Early in the pickup, a shallow angle is preferable, to make sure the film attaches properly to the holder. Once the film is attached, the angle should be changed to become steeper, so that the water meniscus can be minimized. The holder should be pulled out of the water at low speed until the meniscus detaches from the back of the holder; afterwards, it can be removed faster.

Substrate Preparation

All silicon wafers were cleaned in a 100° C. piranha solution (3 parts $H_2SO_4$ to 1 part 30 wt % $H_2O_2$ by volume) and rinsed thoroughly with distilled water prior to use.

PDAC (Sigma-Aldrich, Mw~$1\times10^5$-$2\times10^5$ g/mol) was diluted from the as-received 20 wt % aqueous suspension to 0.5 wt % using distilled water. PDAC was allowed to adsorb on the silicon wafer by spin-casting 1-2 mL of solution onto a silicon wafer at 4000 rpm for 15 s (WS-400 spin coater, Laurell Technologies). The wafer was dried for 10 s on a 100° C. hot plate, and the presence of PDAC was verified by the characteristic dark gray color of a very thin (~10-15 nm) transparent film. Loosely bound PDAC was then removed via thorough rinsing with distilled water; the wafer was then air-dried. Strongly bound PDAC remained on the surface as a submonolayer, as shown by X-ray photoelectron spectroscopy (XPS) results. PDAC used as a sacrificial underlayer was prepared in the same manner, but the rinsing step was omitted.

For samples prepared using the commercial surfactant (Windex Foaming Glass Cleaner, SC Johnson), the surfactant was applied to the wafer using the supplied aerosol container, allowed to sit for 1 min, rinsed thoroughly with distilled water, and air-dried.

Wettability Measurements

Because of the hydrophilicity of the surfaces, we could not measure the contact angle using a traditional side-view camera. Instead, the extent to which a sessile water droplet wetted the surface was measured by first depositing a known volume of water (0.1 μL) with a microsyringe and then immediately collecting an image using a digital optical microscope (Keyence VHX2000). The droplet diameter was measured by fitting a circle to the image of the droplet. The contact angle was estimated assuming a spherical cap for the droplet. Any error introduced by this assumption will affect only the absolute contact angle, not the relative measurement between the two surfaces.

Polymer Deposition

Poly(vinyl formal) (Vinylec E, SPI Supplies) resin was dissolved to 0.5-2 wt % in ethyl lactate (Sigma-Aldrich, >98%). The solution (1-2 mL) was dropped onto a rotating substrate (~300 rpm) and then spun for 3 s at 500-3000 rpm. Polystyrene (PS, Sigma-Aldrich, Mw~$2.8\times10^5$ g/mol) and poly(methyl methacrylate) (PMMA, Sigma-Aldrich, Mw~$1.2\times10^5$ g/mol) were dissolved to 0.3 wt % in toluene (reagent grade, JT Baker) and cast by spinning for 60 s between 2000 and 3000 rpm. The weight fraction of polymer in solution and spin speed were varied depending on the desired film thickness. All films were allowed to dry in place. Any remaining solvent was evaporated by drying on a hot plate at 50° C. for 60 s. Film thickness was measured by spectral reflectometry between 400 and 1050 nm (F20, FilmMetrics).

Delamination and Mechanical Testing

The deposited films were scored in a grid-pattern with a razor blade and slowly immersed in a bath of distilled water at a 40° angle. Individual squares delaminated and floated to the top of the bath where they were captured on a stainless steel hoop-shaped support. For mechanical testing, PVF films were glued onto a 5 mm diameter cylinder, and excess film was cut away with a hot soldering iron tip. The mechanical testing apparatus has been previously described in detail. Briefly, the sample was mounted on a balance and films were indented with a 2 mm diameter ruby or stainless steel ball moving at 0.1 mm/min. Large-area films were delaminated by making a small, single score at the edge of the wafer.

XPS Characterization

Quantitative compositional analysis of the surface chemistry was performed with XPS using a monochromatic Al Kα source (1486.7 eV). The 200 μm X-ray beam was incident normal to the sample, and the detector was 45° from normal. Core-level spectra were collected with pass energy of 23.5 eV with a resolvable XPS peak width of 1.2 eV. Deconvolution of nonresolved peaks was accomplished using Multipak 9.2 (PHI) curve fitting routines with Gaussian-Lorentzian line shapes and a Shirley background. The collected data were referenced to an energy scale with binding energies for Cu 2p3/2 at 932.72±0.05 eV and Au 4f7/2 at 84.01±0.05 eV.

Although the description above contains many details and specifics, these should not be construed as limiting the scope of the application but as merely providing illustrations of some of the presently preferred embodiments of the apparatus, systems, and methods. Other implementations, enhancements and variations can be made based on what is described and illustrated in this patent document. The features of the embodiments described herein may be combined in all possible combinations of methods, apparatus, modules, systems, and computer program products. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments.

Therefore, it will be appreciated that the scope of the present application fully encompasses other embodiments which may become obvious to those skilled in the art. In the claims, reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device to address each and every problem sought to be solved by the present apparatus, systems, and methods, for it to be encompassed by the present claims. Furthermore, no element or component in the present disclosure is intended to be dedicated to the public regardless of whether the element or component is explicitly recited in the claims. No claim element herein is to be construed under the provisions of 35 U.S.C. 112, sixth paragraph, unless the element is expressly recited using the phrase "means for."

While the apparatus, systems, and methods may be susceptible to various modifications and alternative forms, specific embodiments have been shown by way of example in the drawings and have been described in detail herein. However, it should be understood that the application is not intended to be limited to the particular forms disclosed. Rather, the application is to cover all modifications, equivalents, and alternatives falling within the spirit and scope of the application as defined by the following appended claims.

The invention claimed is:

1. An ultrathin polymer film product adapted to be positioned in a water bath, comprising:
   a polymer film,
   a silicon wafer,
   an oxidizing acid cleaned wafer surface on said silicon wafer,
   an electrostatically mediated adsorbed polyelectrolyte monolayer on said oxidizing acid cleaned wafer surface,
   wherein said polymer film has a thicknesses below 100 nm,
   a polymer film surface on said polymer film wherein said polymer film is initially positioned on said silicon wafer and said polymer film surface is initially on said oxidizing acid cleaned wafer surface and said electrostatically mediated adsorbed polyelectrolyte monolayer,
   a marker on said polymer film,
   wherein said electrostatically mediated adsorbed polyelectrolyte on said wafer surface of said silicon wafer enables said polymer film surface to separate from said wafer surface in said water bath leaving said polymer film in said water bath, and
   wherein said marker on said polymer film enables said polymer film to be located in said water bath.

* * * * *